(12) United States Patent
Klapper et al.

(10) Patent No.: US 7,526,870 B2
(45) Date of Patent: May 5, 2009

(54) INCLINATION SENSOR

(75) Inventors: Franz Klapper, Saalburg-Ebersdorf (DE); Herbert Rink, Goettingen (DE); Gerd Freydank, Goettingen (DE)

(73) Assignee: Sartorious AG, Goettingen (DE)

( * ) Notice: Subject to any disclaimer, the term of this patent is extended or adjusted under 35 U.S.C. 154(b) by 0 days.

(21) Appl. No.: 12/120,890

(22) Filed: May 15, 2008

(65) Prior Publication Data

US 2008/0235966 A1    Oct. 2, 2008

Related U.S. Application Data

(63) Continuation of application No. PCT/DE2006/002015, filed on Nov. 17, 2006.

(30) Foreign Application Priority Data

Nov. 23, 2005  (DE) .................... 10 2005 056 120
Nov. 29, 2005  (DE) .................... 10 2005 056 736

(51) Int. Cl.
  *G01C 9/06*    (2006.01)
(52) U.S. Cl. ............... 33/366.23; 33/366.11; 33/366.16
(58) Field of Classification Search ............. 33/366.11, 33/366.12, 366.14, 366.15, 366.16, 366.23
  See application file for complete search history.

(56) References Cited

U.S. PATENT DOCUMENTS

| 5,218,771 | A | * | 6/1993 | Redford ................. 33/366.12 |
| 5,761,818 | A | | 6/1998 | Hopkins et al. |
| 2007/0169362 | A1 | * | 7/2007 | Perchak et al. ......... 33/366.16 |

FOREIGN PATENT DOCUMENTS

| DE | 36 34 244 A1 | | 4/1988 |
| DE | 39 38 848 A1 | | 5/1991 |
| DE | 198 54 812 A1 | | 8/1999 |
| FR | 2 868 834 A1 | | 10/2005 |
| GB | 2 113 383 A | | 8/1983 |
| GB | 2 238 382 A | | 5/1991 |
| GB | 2238382 A | * | 5/1991 |
| JP | 60138415 A | * | 7/1985 |
| JP | 61040505 A | * | 2/1986 |
| JP | 63030713 A | * | 2/1988 |

(Continued)

*Primary Examiner*—Yaritza Guadalupe-McCall
(74) *Attorney, Agent, or Firm*—Muncy, Geissler, Olds & Lowe, PLLC

(57) ABSTRACT

An inclination sensor is provided having a level which has a liquid and a gas bubble in a housing under a covering glass, wherein a light source is arranged above the covering glass. The invention is based on the object of providing an inclination sensor which can be used to determine the direction and degree of an inclination with high accuracy and which is suitable for automatic orientation of an apparatus provided with such an inclination sensor. The object is achieved according to the invention by virtue of an inclination sensor in which at least two light receivers are arranged above the covering glass such that light, which is emitted by the light source and undergoes total internal reflection at the gas bubble when the gas bubble is centered, can be detected by means of these at least two light receivers, wherein different quantities of light can be detected by means of these light receivers when the gas bubble is not centered, and the light receivers are arranged on a chip substrate.

18 Claims, 2 Drawing Sheets

FOREIGN PATENT DOCUMENTS

| | | | | |
|---|---|---|---|---|
| JP | 01083106 | A | * | 3/1989 |
| JP | 01101412 | A | * | 4/1989 |
| JP | 10185557 | A | * | 7/1998 |
| JP | 10-227635 | | | 8/1998 |
| JP | 2001183134 | A | * | 7/2001 |
| JP | 2006317171 | A | * | 11/2006 |

* cited by examiner

INCLINATION SENSOR

This nonprovisional application is a continuation of International Application No. PCT/DE2006/002015, which was filed on Nov. 17, 2006, and which claims priority to German Patent Application Nos. DE 10 2005 056 120.9, which was filed in Germany on Nov. 23, 2005, and DE 10 2005 056 736.3, which was filed in Germany on Nov. 29, 2005, and which are herein incorporated by reference.

BACKGROUND OF THE INVENTION

1. Field of the Invention

The invention relates to an inclination sensor with a spirit level that has a liquid and a gas bubble under a cover glass in a housing, wherein a light source is arranged above the cover glass.

2. Description of the Background Art

Spirit levels are customarily used for horizontal or vertical orientation of apparatuses such as, e.g., measurement instruments. Here, a gas bubble in a sealed liquid indicates the orientation of the spirit level. The gas bubble is always located at the highest point in the liquid. The spirit level is attached to the apparatus such that the gas bubble is located at a defined location in the spirit level only when the apparatus is in the oriented state. The oriented state can be established or reestablished with little effort using the spirit level. The oriented state of the apparatus need not necessarily be horizontal or vertical. In principle, any desired angle of inclination can be specified for the oriented state of the apparatus by an appropriately tilted arrangement of the spirit level.

When the gas bubble is in the defined location, it is designated for the purposes of the invention as being centered.

In order to achieve improved sensitivity, the spirit level can be provided on its top with a cover glass that is concave on the inside. The sensitivity then depends on the radius of curvature of the cover glass, among other factors.

Arrangements are already known in the conventional art with which spirit levels can be read electronically. Photoelectric principles are generally employed for this purpose. The majority of conventional arrangements are based on transilluminating a spirit level, wherein a light source and a photodetector are arranged on opposite sides of the spirit level, in particular on the top and bottom.

For example, DE 39 38 848 A1 describes an inclination sensor containing a conventional tube-type spirit level whose housing consists of a light-transmitting material and whose interior is filled with a liquid surrounding a gas bubble. Located above the tube-type spirit level is a light source that illuminates the entire length of the spirit level. The light emerging from the light source passes through the transparent housing and through the likewise light-transmitting liquid and through the gas bubble. A nonuniform light distribution is produced on the side of the spirit level opposite the light source, and is analyzed by a photodetector located thereunder. Such devices are expensive, require a large amount of space, and generally require specially designed spirit levels. Major disadvantages include the small difference in brightness of the light spot that is to be analyzed, resulting from the low difference in transmission of the gas bubble and liquid, as well as the washed-out contours of the light spot resulting from reflection and scattering effects at the optical interfaces. Sensing of the position of the light spot is thus subject to considerable uncertainties.

Known from DE 36 34 244 A1 is an optoelectronic inclination sensor with a radiation emitter and a radiation detector, in which the radiation emitter and radiation detector are located above a light-reflecting medium, wherein the inclination is detected by reflection at a light-reflecting liquid, preferably at a mercury surface. The liquid is enclosed in a capsule that is filled by the liquid alone, and is only partially filled by the liquid. Detection of the position of a gas bubble is not possible with this arrangement.

Moreover, there is known from JP 10 227 635 A an inclination sensor in which a light source and a photodetector are arranged on the same side of a spirit level, namely above the cover glass. This inclination sensor utilizes the principle of total internal reflection. When the spirit level is horizontal, which is to say when the gas bubble is centered as defined for the purposes of the invention, the light from the light source incident on the gas bubble is totally internally reflected toward the photodetector at the interface between the optically denser cover glass and the optically less dense gas bubble. The light that is totally internally reflected in the centered case can be detected by means of the photodetector. If the gas bubble is off-center, no total internal reflection takes place, and thus no light incidence on the photodetector. It is thus possible to determine whether the gas bubble is centered or not using the detectable light. This serves as a binary indication of a horizontal, vertical, or other predefined orientation of an apparatus. This inclination sensor has the disadvantage that the direction and amount of inclination cannot be determined. Automatic orientation of an apparatus equipped with such an inclination sensor is thus not possible.

SUMMARY OF THE INVENTION

It is therefore an object of the invention to provide an inclination sensor in which the direction and amount of inclination can be determined with high precision, and which is suitable for automatic orientation of an apparatus equipped with such an inclination sensor.

It is proposed, in an embodiment, to arrange a light source and at least two photodetectors above the cover glass in such a manner that light emitted by the light source and totally internally reflected at a gas bubble when the gas bubble is centered can be detected by these at least two photodetectors, and wherein when the gas bubble is off-center different quantities of light can be detected using these photodetectors. With the aid of two or preferably more photodetectors, the position of the gas bubble, and thus its deviation from the centered position, can be sensed with great precision not only in terms of the amount, but also the direction. This can be used, in particular, for automatic orientation of an apparatus equipped with the inventive inclination sensor. With exactly two photodetectors, the direction of inclination can be sensed in one direction. The light source and the photodetectors are arranged on a common chip substrate. This makes compact construction possible at low cost.

In an embodiment, at least four photodetectors are arranged around the light source in such a manner that the light that is emitted by the light source, and is totally internally reflected by the gas bubble when the gas bubble is centered, can be detected by means of these at least four photodetectors. The four photodetectors are preferably designed in a planar fashion such that they cover all quadrants of a plane. Four photodetectors permit sensing of the direction of inclination in two dimensions with high precision. The directional determination in two dimensions can be further refined with a higher number of photodetectors, for example eight, which cover all octants of a plane.

Compact construction of the inclination sensor and high precision of measurement are made possible in that the light source is centrally located over the gas bubble when the gas bubble is centered.

In an embodiment, the chip substrate is arranged with its functional side on the cover glass or on a glass substrate that forms an optical unit together with the cover glass. These alternatives permit a function-based spacing of the light-source/photodetector unit from the gas bubble with little effort.

Sensing the inclination is possible with little effort when the spacing between the light source and each of the photodetectors is essentially the same. Then, for all directions of excursion, the photodetectors provide symmetrical light quantity signals for a particular amount of excursion when the photodetectors have matching characteristics with regard to area and sensitivity.

High precision in measuring excursion along a virtual line is possible with an embodiment in which at least one of the additional photodetectors is located essentially opposite the first photodetector with regard to the light source. In this way, the symmetrical signals of the opposite photodetectors are maximally spread. In an embodiment with four photodetectors, these are preferably arranged in opposing pairs. In this way, a superposition of two virtual lines of excursion can be used for a complete sensing of the two-dimensional excursion of the gas bubble.

In another embodiment, the photodetectors can be segmented in a plane parallel to the cover glass along virtual lines passing through the light source and the relevant photodetectors, where totally internally reflected light can be detected by means of these segments independently of the other respective segments. In particular, with a rotationally symmetric arrangement of the photodetectors about the light source, the photodetectors can be segmented radially. In this way, the precision of sensing of the amount of excursion can be increased.

Improved precision can be achieved through an embodiment wherein a light-absorbing area with a diameter smaller than that of the gas bubble is located below the light source and spaced apart therefrom, wherein the light-absorbing area does not restrict light suitable for total internal reflection. In this way, scattered light that is not due to totally internally reflected light can be avoided.

In this regard, the light-absorbing area can be located below the cover glass. An arrangement between the underside of the cover glass and the light source is also possible. The higher the light-absorbing area is located, the smaller its diameter should be made so that light from the light source can still strike the centered gas bubble.

In an embodiment, the housing can have a light-absorbing surface on the inside. This avoids scattered light from non-totally internally reflected light passing through the liquid.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Corresponding parts are labeled with the same reference numbers in all drawing figures.

Figure 1:
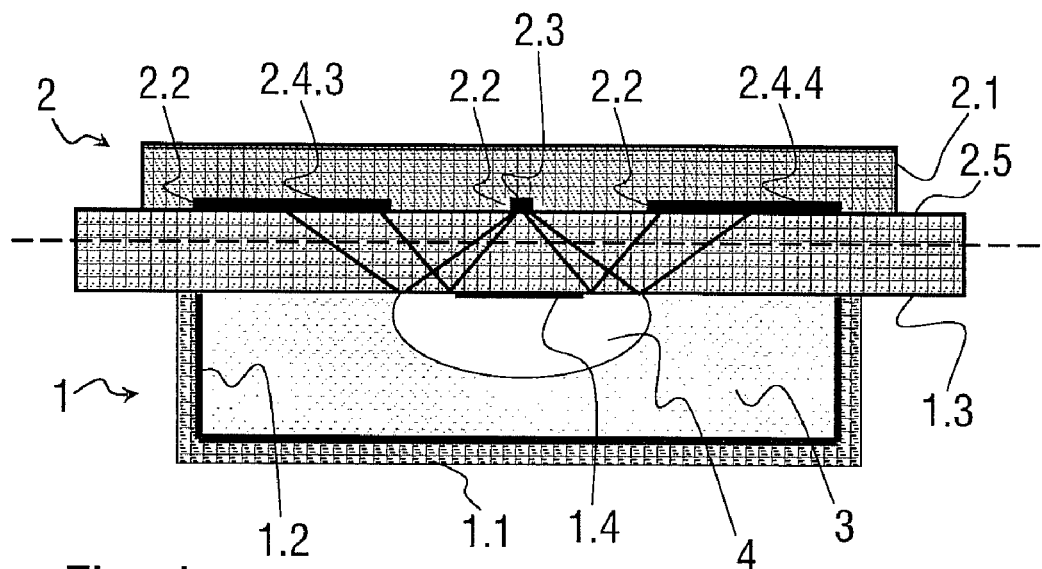
FIG. 1 is a cross-sectional view of an inclination sensor.
Figure 2:
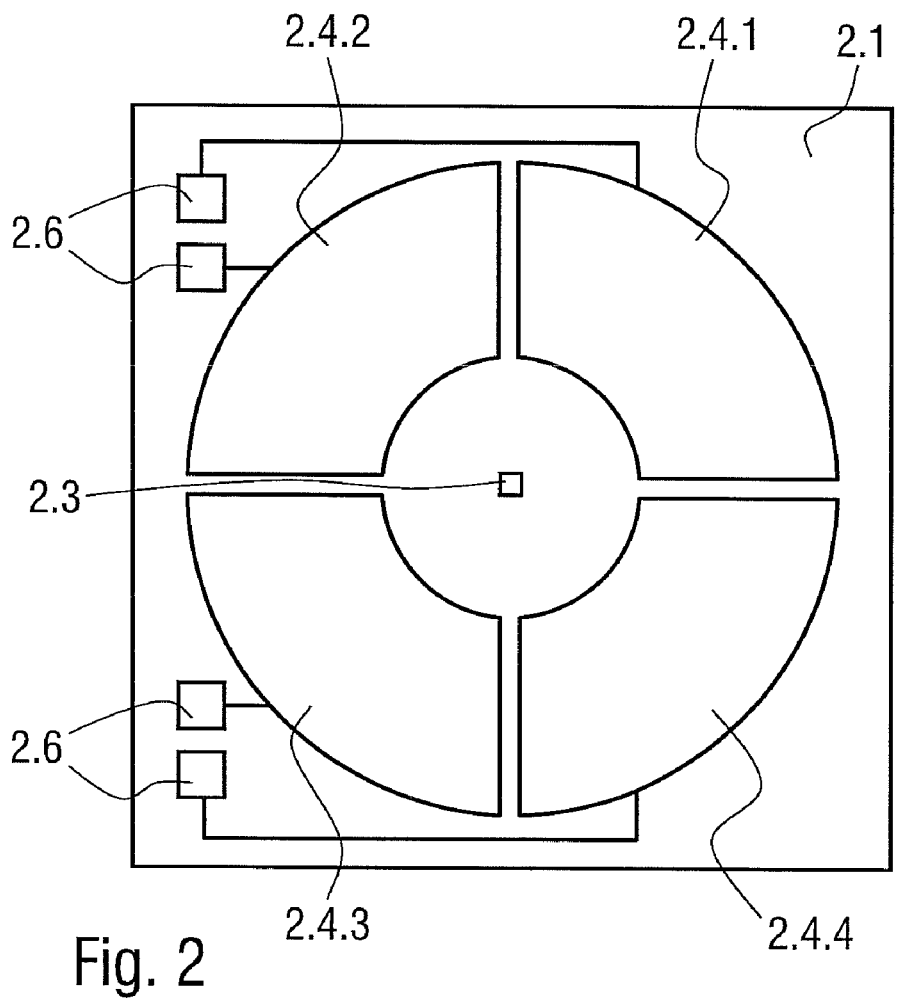
FIG. 2 is a top view of its chip substrate.

FIGS. 1 and 2 show an inclination sensor according to the invention, which includes a spirit level 1 and a measurement module 2.

The spirit level 1 can be in the form of a circular spirit level, and has a housing 1.1 with a light-absorbing surface 1.2 on the inside. Such a surface 1.2 can be produced, for example, by a coating. The spirit level has a diameter of 12 mm. The housing 1.1 is sealed on the top with a cover glass 1.3, which has a concave curvature on the inside and has an index of refraction of about $n_G$=1.50. The curvature is not visible in the scale of the drawing. In useful fashion, the curvature is adapted to the requirements for sensitivity of the spirit level 1. The cover glass 1.3 is provided on its underside with a light-absorbing area 1.4, where the cover glass 1.3 is blackened. The housing 1.1 is filled with a fluid 3 having an index of refraction $n_F$, for example water that has a refraction of $n_F$=1.33, including a gas bubble 4. The gas bubble 4 contains air saturated with water, and has an index of refraction of about $n_L$=1.00. Instead of water, it is advantageously possible to use a liquid 3 for which lower adhesion forces to glass arise. In any case, the following is true of the indices of refraction: $n_G>n_F>n_L$. In the depicted state of the inclination sensor, the gas bubble 4 is centered. In the event of tilting, it moves laterally toward the edge of the housing and thus becomes off-center.

The measurement module 2 has a chip substrate 2.1 with surface recesses 2.2 in which are integrated, essentially along a plane, a light source 2.3 in the form of an LED, and four photodetectors 2.4.1, 2.4.2, 2.4.3, 2.4.4 in the form of photodetectors having the shape of segments of a circular ring. The inner edges of the circular ring segments, which cover four quadrants of a two-dimensional area, are located about 2.5 mm from the light source 2.3. The recesses 2.2 prevent direct cross-talk from the light source 2.3 to the photodetectors 2.4. The chip substrate 2.1 is designed in a flip-chip technology with its functional side on the bottom attached to a glass substrate 2.5 as a transparent layer. The electrical lines to the external terminals 2.6 of the light source 2.3 and the photodetectors 2.4 are located on the glass substrate 2.5 and are connected thereto by terminal areas ("bumps"). For reasons of clarity, the terminal of the light source 2.3 is not shown. The hollow space between the chip substrate 2.1 and the glass substrate 2.5 resulting from the contact is filled with a filler material whose index of refraction and thermal properties match those of the glass substrate 2.5.

In alternative embodiments, it is possible to arrange, on the back side of the chip substrate 2.1, a carrier having suitable lines with which the light source 2.3 and the photodetectors 2.4 are electrically connected by bonding.

The glass substrate 2.5 is cemented to the cover glass 1.3 of the spirit level 1. The optical unit composed of the two glasses 1.3, 2.5 can have a thickness of 1.6 mm. A light-absorbing area could be arranged between the glass substrate 2.5 and the cover glass 1.3 as an alternative to placing it on the underside of the cover glass 1.3.

In other embodiments, the glass substrate 2.5 can be completely eliminated. The chip substrate 2.1 is then applied with its functional top side, on which are arranged the light source 2.3 and photodetectors 2.4, directly on the cover glass 1.3, so that the functionally required distance between the light source 2.3 and the gas bubble 4 is created by the cover glass 1.3 alone.

The functionally required distance varies, in particular, as a function of the arrangement of the light source 2.3 and the photodetectors 2.4 and of the size of the gas bubble 4. It prescribes the cone of possible angles of incidence on the spirit level, and thus also the spreading of the totally internally reflected light. The functionally required distance is thus related to the spacing of the photodetectors 2.4 from the light source 2.3 and the area and sensitivity of the photodetectors 2.4. Preferably, a spacing in the range of 1.0 mm to 2.0 mm, in particular 1.6 mm, is chosen.

FIG. 1 schematically shows the paths of several rays from the light source 2.3 to two opposing photodetectors 2.4 arising from total internal reflection at the gas bubble 4, which is centered here. It can easily be seen that the illuminated areas of the two photodetectors 2.4, and thus the two light quantity signals emitted thereby, change if the gas bubble 4 is displaced. The amount of such an excursion of the gas bubble 4 can be determined with particular fineness if the photodetectors 2.4 are segmented radially, and thus multiple light quantity signals are present from each of the photodetectors 2.4. However, even with unsegmented photodetectors 2.4 arranged in opposing pairs, a high measurement precision is possible in the form illustrated, since at least two complementary integrated signals are available for each direction of excursion.

Figure 3A:
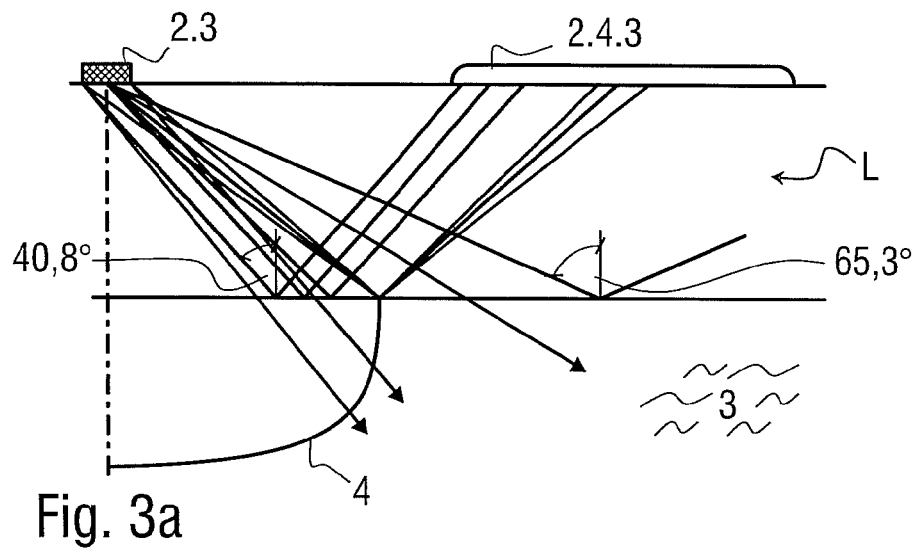
FIG. 3 illustrates ray paths between a light source and a photodetector to illustrate the principle of operation.
Figure 3B:
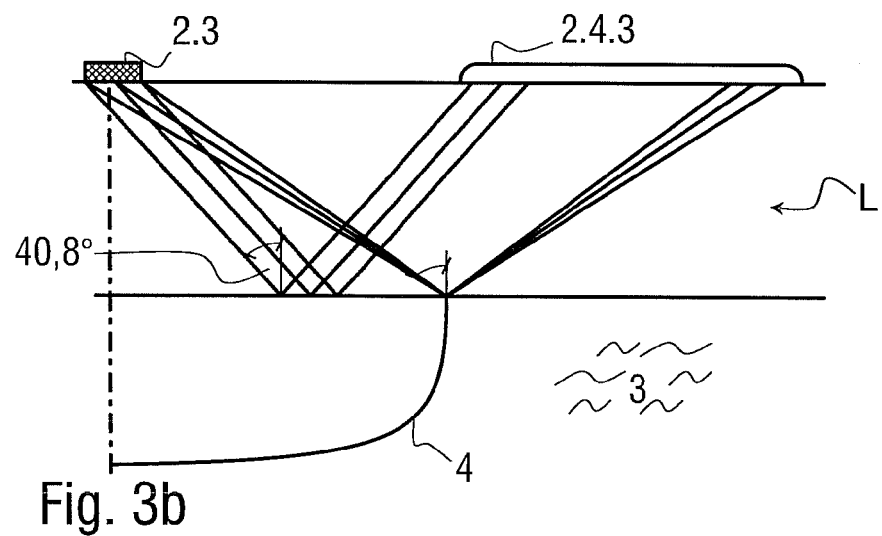
Figure 3C:
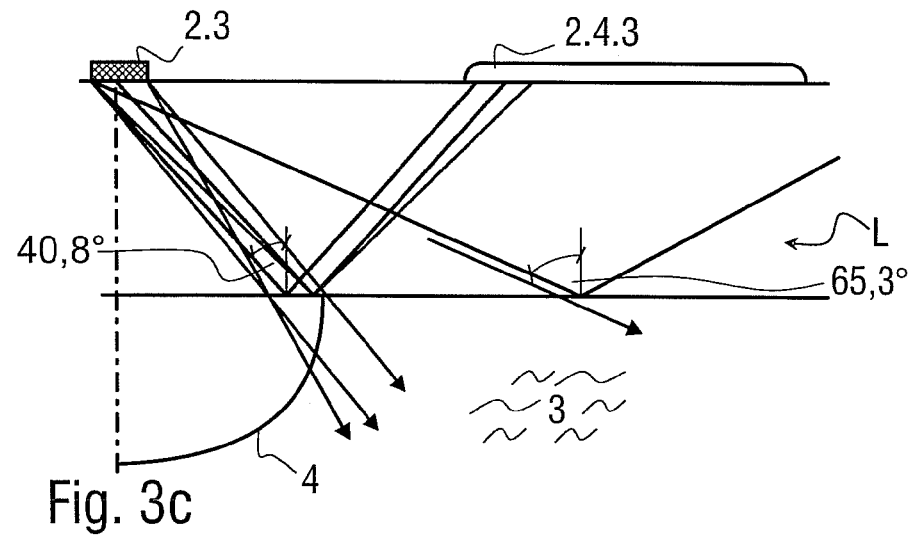

FIGS. 3a-c show details of the paths of rays on one side of a gas bubble 4. In FIG. 3a, the gas bubble 4 is in the centered position. In FIG. 3b, the gas bubble 4 is displaced in the plane of the drawing toward the detector 2.4.3. In FIG. 3c, the gas bubble 4 is displaced in the opposite direction.

The rays of light L emerging from the light source 2.3 are absorbed in the area of incidence of the light-absorbing area 4, by which means scattered light from undesirable reflections, for example at the bottom of the spirit level 1, is avoided. A large fraction of the light rays L striking the gas bubble 4 is totally internally reflected at this optically less dense medium, $n_G > n_L$, and then strikes the photodetector 2.4.3. Light rays L striking at too sharp an angle undergo no total internal reflection and pass through the gas bubble 4 until they are absorbed at the bottom of the spirit level 1. The critical angle $\epsilon_L$ of total internal reflection at the gas bubble 4 is determined in this case from:

$$\epsilon_L = \arcsin n_L/n_G = 42.8°.$$

A significantly larger critical angle for total internal reflection applies to the light rays L incident at the interface between the cover glass 1.3 and the liquid 3 due to the smaller difference in the indices of refraction ($n_G > n_F > n_L$): $\epsilon_L = \arcsin n_F/n_G = 62.5°$. For this reason, most of the rays enter the liquid 4 and pass through it, where they are absorbed at the bottom of the housing, for example, and only a small fraction of them are totally internally reflected, in order to ultimately strike the chip substrate 2.1 outside the photodetector 2.4.3. Consequently they are not detected in the photodetector 2.4.3. This makes it possible to measure the position of the gas bubble 4 using the light quantity signals of the photodetectors 2.4. The precision of the measurement is further increased by the fact that the quantity of light at the opposite detector 2.4.1 decreases by approximately the same amount. In this way, it is possible to not only measure the amount of excursion with high precision, but also the direction of excursion, using four photodetectors 2.4.

For simple analysis of the light quantity signals, the difference of the light quantity signals from opposite photodetectors 2.4 can advantageously be used. It has a large linear region about the centered position of the gas bubble 4 for a high precision in measurement of position and thus inclination.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An inclination sensor comprising:
a spirit level that has a liquid and a gas bubble under a cover glass in a housing;
a light source arranged above the cover glass; and
at least two photodetectors arranged above the cover glass for detecting light emitted by the light source, the light source and the photodectors being arranged on a chip substrate,
wherein, when the gas bubble is centered, the light is substantially completely reflected at the gas bubble and the light is thereby detected by the at least two photodetectors, and
wherein, when the gas bubble is off-center, different quantities of light are detected by the photodetectors.

2. The inclination sensor according to claim 1, further comprising an additional two photodetectors, the additional two and at least two photodetectors being arranged around the light source in such a manner that the light that is emitted by the light source, and is substantially completely internally reflected by the gas bubble when the gas bubble is centered, is detected by the photodetectors.

3. The inclination sensor according to claim 1, wherein the light source is centrally located over the gas bubble when the gas bubble is centered.

4. The inclination sensor according to claim 1, wherein the light source and the photodetectors are arranged on a common chip substrate.

5. The inclination sensor according to claim 4, wherein the chip substrate is arranged with a functional side on the cover glass or on a glass substrate such that the chip substrate forms an optical unit together with the cover glass.

6. The inclination sensor according to claim 1, wherein the spacing between the light source and each of the photodetectors is substantially the same.

7. The inclination sensor according to claim 1, wherein the additional photodetector is located substantially opposite the first photodetector with respect to the light source.

8. The inclination sensor according to claim 1, wherein the photodetectors are segmented in a plane parallel to the cover glass along virtual lines passing through the light source and the relevant photodetectors, and wherein the substantially completely internally reflected light is detected by the segments independently of the other respective segments.

9. The inclination sensor according to claim 1, wherein a light-absorbing area having a diameter smaller than that of the gas bubble is located below the light source and spaced apart therefrom, and wherein the light-absorbing area does not restrict light suitable for total internal reflection.

10. The inclination sensor according to claim 9, wherein the light-absorbing area is located below the cover glass.

11. The inclination sensor according to claim 1, wherein the housing has a light-absorbing surface on an interior thereof.

12. The inclination sensor according to claim 1, wherein the chip substrate is arranged with a functional side directly on the cover glass such that the chip substrate forms an optical unit together with the cover glass.

13. The inclination sensor according to claim 1, wherein an entire space along a path of the light between the light source and the gas bubble has a same index of retraction.

14. The inclination sensor according to claim 1, wherein a distance between the light source and the gas bubble is equal to a thickness of the cover glass.

15. The inclination sensor according to claim 1, wherein a lower side of the cover glass seals the liquid and gas bubble in the housing.

16. The inclination sensor according to claim 1, wherein the cover glass has a concave curvature on a side facing the housing.

17. The inclination sensor according to claim 1, wherein the cover glass has an index of refraction of substantially $nG=1.50$.

18. The inclination sensor according to claim 1, wherein a thickness of the cover glass is 1.6 mm.

* * * * *